United States Patent Office 3,398,174
Patented Aug. 20, 1968

3,398,174
METHOD OF SYNTHESIZING ORGANOSILICON COMPOUNDS
Garrett H. Barnes, Jr., Pittsburgh, Pa., assignor to Dow Corning Corporation, Midland, Mich., a corporation of Michigan
No Drawing. Filed Feb. 3, 1965, Ser. No. 430,194
2 Claims. (Cl. 260—448.2)

ABSTRACT OF THE DISCLOSURE

By employing buffer solutions, addition of SiH compounds to aliphatic unsaturated compounds in contact with chloroplatinic acid can be satisfactorily achieved in the presence of hydroxyl compounds such as water or alcohols.

---

This invention relates to the addition of SiH compounds to aliphatic unsaturated compounds in the presence of chloroplatinic acid.

One of the most versatile methods of synthesizing organosilicon compounds involves the addition of an SiH containing compound to a compound containing terminal olefinic unsaturation. One of the best catalysts for this addition is chloroplatinic acid. The versatility of the reaction in the presence of this catalyst is shown in U.S. Patent 2,823,218.

It has been found, however, that the reaction of the SiH compound with olefinic unsaturated compounds employing chloroplatinic acid as a catalyst cannot be satisfactorily carried out in the presence of hydroxyl compounds such as water or alcohols. When such materials are present, a reaction occurs which in some cases is the predominant one. This reaction is as follows:

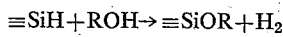

$$\equiv SiH + ROH \rightarrow \equiv SiOR + H_2$$

This means that when chloroplatinic acid is the catalyst, one cannot satisfactorily add unsaturated alcohols to SiH compounds without an appreciable side reaction occurring. Also, one cannot employ alcohols as solvents for the reaction, nor can one tolerate water being present during the reaction. The latter can be particularly annoying when one is adding polyalkylene oxides having terminal unsaturation to SiH compounds. Since the polyalkylene oxides are generally hydroscopic, one must carefully dry them prior to the reaction. This drying step is sometimes expensive and it would be advantageous to be able to add SiH compounds to terminally unsaturated polyalkylene oxides without the necessity of drying the reactants.

The above objections are eliminated by employing the method of this invention.

This invention relates to a method of reacting in contact with chloroplatinic acid catalyst, an SiH-containing compound with an organic compound containing terminal carbon-carbon unsaturation in the presence of a compound containing the hydroxyl group (i.e. alcohols and water), whereby addition of the SiH group to the carbon-carbon unsaturation takes place, the improvement comprising carrying out said reaction in contact with a buffer solution, which in an aqueous system will in the presence of a strong acid maintain the system at a pH of from about 5 to about 7 inclusive.

The improvement employed in this invention consists in using the above defined buffer solution for carrying out the reaction in the presence of alcohols or water. Any buffer system which will maintain a pH between 5 and 7 is operative herein. Specific examples of such buffers are mixtures of alkali metal hydroxides and potassium acid phthalate, sodium acetate, secondary sodium citrate; mixtures of potassium acid phosphate and disodium phosphate and mixtures of potassium acid phosphate and NaOH. Many other buffer compositions will be apparent to those skilled in the art.

The reaction of this invention is applicable to any organosilicon compound containing an SiH group and any olefinic compound containing a terminal carbon-carbon unsaturation, except those compounds which contain acidic groups such as carboxyl or sulfonic acid groups, or which when in the presence of alcohols or water will produce strong acids. Thus, for example, the reaction is not operative with chlorosilanes or acyloxy silanes in general, nor with organic compounds such as acyl halides or compounds containing readily hydrolyzable halogen atoms. The organosilicon and the organic olefinic compound can also not contain basic groups, such as amino or quaternary ammonium groups, nor groups which will hydrolyze readily with water to produce a basic media. Thus, for example, silazanes are not operative in this invention. In addition, the reaction will not proceed with acrylonitrile because platinum does not catalyze the addition of this material to SiH compounds.

Examples of operative organosilicon compounds which may be employed herein, are silanes such as $SiH_4$, $R_3SiH$,

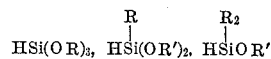

$$HSi(OR)_3, \quad HSi(OR')_2, \quad HSiOR'$$

and $H_2Si(OR')_2$; silanes of the formula

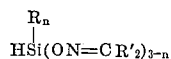

$$HSi(ON=CR'_2)_{3-n}$$

in which $n$ is 0, 1 or 2, and siloxanes of the unit formulae $HSiO_{1.5}$, $H_2SiO$,

$$HSiO_{\frac{3-x}{2}}$$

in which $x$ is 1 or 2, and copolymers of said siloxanes with siloxanes of the unit formula

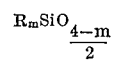

$$R_mSiO_{\frac{4-m}{2}}$$

in which $m$ is 0, 1, 2 or 3. In any of the silanes or siloxanes above, R and R' can be any organic radical (which is free of acidic or basic groups) such as hydrocarbon radicals such as methyl, ethyl, octadecyl, vinyl, allyl, cyclohexyl, cyclohexenyl, vinylcyclohexyl, methylcyclohexyl, phenyl, xenyl, tolyl, naphthyl, anthracyl, benzyl, and beta-phenylpropyl; any halohydrocarbon radical such as chloromethyl, gamma-chloropropyl, trifluoropropyl, $C_7F_{15}CH_2CH_2$—, bromocyclohexyl, alpha,alpha,alpha-trifluorotolyl, perfluorovinyl, chlorophenyl, bromoxenyl, para-chlorobenzyl and pentachloroxenyl; substituted hydrocarbon radicals such as hydrocarbon ether radicals such as —$CH_2CH_2OCH_2CH_2OCH_3$; hydrocarbon ester radicals such as —$CH_2CH_2CH_2OOCCH_3$; hydroxylated radicals such as —$CH_2CH_2CH_2OH$; amide radicals such as —$CH_2CH_2CONH_2$ and —$CH_2CH_2CON(CH_3)_2$; nitrile radicals such as —$CH_2CH_2CN$, and radicals containing carbonyl groups such as —$CH_2CH_2CH_2CO$.

The olefinic compound employed herein can be any organic compound having a carbon-carbon double bond in the terminal position. This includes organosilicon compounds which means that both the SiH compound and the compound containing the unsaturation can be organosilicon compounds and, in fact, the hydrogen and the olefinic group can be attached to the same silicon atom as is shown in the examples below. In addition to unsaturated organosilicon compounds the olefin compounds can be olefinic hydrocarbons such as ethylene, butylene, octadecylene, vinylcyclohexene, styrene, vinyltoluene, divinylbenzene and butadiene; unsaturated alcohols such as allyl alcohol; unsaturated ethers such as methylvinylether, methylallyl ether, the allyl ether of trimethylolpropane, the monoallylether of glycerin, and the triallylether of glycerin; unsaturated esters such as vinylacetate, allylacetate, methylmethacrylate, butylmethacrylate and allylbenzoate; unsaturated haloolefins such as vinyl chloride, allyl chloride, methallyl chloride, chloroprene, trifluoroprene, and chlorostyrene; unsaturated amides such as acryl amide, N,N-dimethylacrylamide, and unsaturated aldehydes and ketones such as allylmethylketone, and acrolein.

The reaction of this invention can be carried out under the normal conditions for adding SiH compounds to olefins in the presence of chloroplatinic acid. The temperature required can range from room temperature up to 150° C. or above, but, in general, the reaction proceeds at temperatures below the latter temperature. The amount of buffer solution and catalyst is not critical so long as there is sufficient buffer solution to maintain the pH in the specified range and so long as there is sufficient catalyst to make the reaction go in a reasonable time.

The following examples are illustrative only and should not be construed as limiting the invention which is properly delineated in the appended claims. In the formulae shown below the following abbreviations are used pH for phenyl, Me for methyl, and Et for ethyl.

Example 1

The buffer solution employed in this example was made by mixing 23.8 ml. of .2 Normal NaOH and 50 ml. of .2 M potassium acid phthalate. This solution has a pH of 5. 0.1 mole of vinyldiphenylsilane was mixed with 140 ml. of t-butanol, 7 ml. of the buffer solution and chloroplatinic acid in the amount of $2.8 \times 10^{-4}$ g./atoms of platinum per mole of SiH. The mixture was allowed to stand at room temperature for 24 hours. A good yield of the polymer of the formula $$(-\underset{\underset{\text{Ph}_2}{|}}{\text{Si}}\text{CH}_2\text{CH}_2-)_x$$

was obtained.

Example 2

.15 mole of phenyldimethylsilane and .15 mole of vinyltrimethylsilane were mixed with 140 ml. of butanol, 10.5 ml. of the buffer solution of Example 1 and chloroplatinic acid in the proportion employed in Example 1 and the mixture allowed to stand at room temperature for 42 hours. An 80% yield of phMe$_2$SiCH$_2$CH$_2$SiMe$_3$ was obtained.

Example 3

.1 mole of phenyldimethylsilane, .1 mole of allyl alcohol was mixed in 140 ml. of t-butanol, 7 ml. of the buffer solution of Example 1 and chloroplatinic acid in the example and the amount shown in that example and allowed to stand at room temperature for 46 hours. An excellent yield of the silane phenyldimethyl(gamma-hydroxypropyl)silane was obtained.

This experiment was repeated except that the buffer solution was omitted. Instead of the desired product, the following materials were obtained in amounts totaling 87.5% of theory.

Phenyldimethylallyloxysilane
Phenyldimethylpropoxysilane
Phenyldimethyltertiarybutoxysilane Example 4

.1 mole of 1,1,3,3-tetramethyl-1-ethyldisiloxane was mixed with 100 ml. of allyl alcohol, 7 ml. of the buffer solution of Example 1, and chloroplatinic acid in the amount of $2.8 \times 10^{-4}$ g./atoms of platinum per mole of SiH. The mixture was allowed to stand at 31–45° C. for 19 hours, and an excellent yield of the compound 1,1,3,3-tetramethyl - 1 - ethyl - 3 - (gamma - hydroxypropyl)disiloxane was obtained.

Example 5

The buffer solution employed in this example was a .1 molar solution of sodium acetate in ethanol. This solution has a pH of about 5.5.

.1 mole of 1,1,3,3-tetramethyl-1-ethyldisiloxane was mixed with .2 mole of 1-butene-3-ol, .5 ml. of the buffer solution and chloroplatinic acid in the amount of $4 \times 10^{-5}$ g./atoms of platinum per mole of SiH and the mixture was heated at 110° C. for 18 hours. There was obtained a good yield of the compound 1,1,3,3-tetramethyl-1-ethyl-3-(3-hydroxy-3-methylpropyl)disiloxane.

Example 6

Employing the procedure of Example 5, .1 mole of phenyldimethylsilane was reacted with 2 moles of methallyl alcohol at room temperature for 3 days, and there was obtained a 91% yield of the compound phenyldimethyl-(3-hydroxy-2-methylpropyl)silane.

Example 7

Employing the procedure of Example 5, .1 mole of 1,1,3,3-tetramethyl-1-ethydisiloxane was reacted with .2 mole of methallyl alcohol at 61–112° C. for 3 hours to give excellent yields of 1,1,3,3-tetramethyl-1-ethyl-3-(3-hydroxy-2-methylpropyl)disiloxane.

Example 8

Employing the buffer solution of Example 5, the following compounds can be prepared.

| Olefins | Silicon Compound | Product |
|---|---|---|
| Monoallyl ether of glycerin | HSi(OEt)$_3$ | HOCH$_2$$\overset{\underset{\mid}{\text{OH}}}{\text{C}}$HCH$_2$O(CH$_2$)$_2$Si(OEt)$_3$ |
| Allyl glycidyl ether in ethanol | $\underset{\underset{\text{Me}}{\mid}}{\text{H}}$Si(OMe)$_2$ | 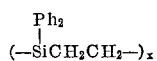CH$_2$CHCH$_2$O(CH$_2$)$_3$Si(OMe)$_2$ |
| Allyl alcohol | Copolymer of— | Copolymer of— |
|  | 10 mol percent M$\underset{\underset{\text{H}}{\mid}}{\text{e}}$SiO | 10 mol percent HO(CH$_2$)$_3$$\underset{\underset{\text{Me}}{\mid}}{\text{S}}$iO |
|  | 40 mol percent Me$_2$SiO | 40 mol percent Me$_2$SiO |
|  | 40 mol percent PhMeSiO | 40 mol percent PhMeSiO |
|  | 10 mol percent PhSiO$_{1.5}$ | 10 mol percent PhSiO$_{1.5}$ |
| Monoallyl ether of ethylene glycol | Copolymer of— | Copolymer of— |
|  | 10 mol percent HSiO$_{1.5}$ | 10 mol percent HOCH$_2$CH$_2$O(CH$_2$)$_3$SiO$_{1.5}$ |
|  | 20 mol percent C$_{18}$H$_{37}$SiO$_{1.5}$ | 20 mol percent C$_{18}$H$_{37}$SiO$_{1.5}$ |
|  | 20 mol percent ⌬S⌭$\underset{\underset{\text{Me}}{\mid}}{\text{S}}$iO | 20 mol percent ⌬S⌭$\underset{\underset{\text{Me}}{\mid}}{\text{S}}$iO |

| Olefins | Silicon Compound | Product |
|---|---|---|
| | 20 mol percent ⟨hexene⟩CHCH₂Si(Me)(Me)O | 20 mol percent ⟨hexene⟩C(H)(CH₂Si(Me)(Me)O) |
| | 20 mol percent CF₃CH₂CH₂Si(Me)O | 20 mol percent CF₃CH₂CH₂Si(Me)O |
| | 10 mol percent ClC₆H₄Si(Me)O | 10 mol percent ClC₆H₄Si(Me)O |
| Allyl lactate | HSi(Me₂)(OSi(Me₂))₅OSiH(Me₂) | CH₃CHOHCOO(CH₂)₃OSi(Me₂)(OSi(Me₂))₅OSi(Me₂)(CH₂)₃OOCCHOHCH₃ |

That which is claimed is:
1. In the method of reacting in contact with chloroplatinic acid catalyst an SiH compound with an organic compound containing terminal carbon-carbon unsaturation, except acrylonitrile, said SiH compound and organic compound being free of acid and basic groups and any group which will hydrolyze to produce acid and basic groups, whereby addition of the SiH group to the carbon-carbon unsaturation takes place, the improvement comprising carrying out said reaction in the presence of water or an alcohol free of acid and basic groups and any group which hydrolyze to produce acid or basic groups with a buffer which is an aqueous system will, in the presence of a strong acid, maintain the system at a pH of from about 5 to about 7 inclusive.

2. The method of claim 1 in which the organic compound containing the terminal carbon-carbon unsaturation is an alcohol.

References Cited

UNITED STATES PATENTS 2,823,218  2/1958  Speier et al. _____ 260—448.2
2,970,150  1/1961  Bailey _____ 260—448.2 XR HELEN M. McCARTHY, *Primary Examiner.*

P. F. SHAVER, *Assistant Examiner.*